US008162272B2

(12) United States Patent
Trott

(10) Patent No.: US 8,162,272 B2
(45) Date of Patent: Apr. 24, 2012

(54) WINDOW MAINTENANCE APPARATUS FOR A TILT-IN SASH

(76) Inventor: Donald Trott, Sandwich, MA (US)

( * ) Notice: Subject to any disclaimer, the term of this patent is extended or adjusted under 35 U.S.C. 154(b) by 453 days.

(21) Appl. No.: 12/467,212

(22) Filed: May 15, 2009

(65) Prior Publication Data

US 2010/0287731 A1 Nov. 18, 2010

(51) Int. Cl.
*F16M 11/24* (2006.01)

(52) U.S. Cl. .................................................... 248/176.3

(58) Field of Classification Search .................. 269/139; 248/176.1, 176.3, 185.1, 188.1, 188.6
See application file for complete search history.

(56) References Cited

U.S. PATENT DOCUMENTS

| | | | | |
|---|---|---|---|---|
| 362,608 | A | 5/1887 | Clark | |
| 575,543 | A | 1/1897 | Clarke | |
| 4,520,981 | A | 6/1985 | Harrigan | |
| 4,605,193 | A | 8/1986 | Kuparinen | |
| 4,684,091 | A | 8/1987 | Moreschi | |
| 4,763,865 | A | 8/1988 | Danner | |
| 4,883,246 | A * | 11/1989 | Esposito | 248/165 |
| 5,020,756 | A | 6/1991 | Bauer | |
| 5,863,353 | A | 1/1999 | Snipe, Jr. | |
| 5,927,664 | A | 7/1999 | Schmidt | |
| 6,095,319 | A | 8/2000 | Noniewicz et al. | |
| 6,684,454 | B2 | 2/2004 | Ehrenreich | |
| 7,331,139 | B2 | 2/2008 | Moses | |
| 7,950,635 | B2 * | 5/2011 | Proehl | 269/17 |
| 2005/0051940 | A1 * | 3/2005 | Bensman | 269/139 |
| 2006/0081740 | A1 * | 4/2006 | Bellavance | 248/176.1 |

* cited by examiner

*Primary Examiner* — David B Thomas

(57) ABSTRACT

A window maintenance apparatus for a tilt-in sash includes a base leg for extending generally upwards from a floor towards a window. The base leg includes a first foot for resting on the floor. A hinged leg is joined to the base leg proximate an end of the base leg for extending generally downwards towards the floor. The hinged leg includes a second foot for resting on the floor. An extension tube extends upwardly from the base leg where a length of the extension tube above the base leg is adjustable. A locking mechanism locks the extension tube at an adjusted length above the base leg. A first sash support is rotatably joined at a first position on the extension tube for rotating about the extension tube from a first position to a second position for supporting the tilt-in sash in a generally horizontal position.

17 Claims, 3 Drawing Sheets

WINDOW MAINTENANCE APPARATUS FOR A TILT-IN SASH

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to windows. More particularly, the invention relates to a support for tilt-in window sashes.

BACKGROUND OF THE INVENTION

The large majority of residential homes as well as commercial properties have double hung windows with a tilt-in sash feature. New construction double hung windows and replacement windows are manufactured primarily today with the tilt-in window sash feature that enables an individual to tilt-in the window sashes from the normal gliding vertical position to a horizontal position allowing the individual to perform maintenance on the window sashes or framework components from inside the residential or commercial property.

While this solves a problem for homeowners, window repair professionals, painters, and professional cleaners, it also creates other problems. Some of the more common problems associated with the tilt-in window sash feature is that there is no predetermined stop for the tilt-in sash when opening to a horizontal position, which can result in damage to the tilt-in window sashes, window sills, and the track mechanism which enables the sashes to glide vertically and to the horizontal tilt-in position. Damage can also be caused to the vinyl, aluminum or wood cladding of the sashes and to the framework itself or to the finish of the window sills, sash, framework, or track mechanism. There are also insulated glass seals that could be damaged by this feature.

There is also the problem of the increasing size and weight of manufactured double hung tilt-in style windows. These window sashes can become heavy or cumbersome, which makes the job of maintaining the window sashes or components of the framework difficult. Also, these windows may comply to various federal and local building code guidelines throughout the United States, requirements concerning wind pressure, high impact resistance and design pressure, and glass, sash and window frame ratings which can also be compromised and or damaged when tilted.

When an individual is trying to perform the tilt-in feature of a double hung window, the individual opens the lower sash to a horizontal position and must hold the sash in place with one hand and perform maintenance with the other hand. Furthermore, if the individual needs to tilt-in the upper sash, the lower sash must be held in the horizontal position while trying to repeat the tilt-in procedure for the upper sash, which can be difficult.

If the window sashes are able to tilt in to the full open downward position, the lower sash comes into contact with the inside window sill, and the leverage created by this arrangement exerts a tremendous amount of pressure on the tilted sash at the point of contact with the window sill and against the track mechanism that allows the window sash to tilt in. This configuration can cause damage to the vinyl, aluminum or wood clad sashes, the framework, the sills, the track mechanism, the insulted glass seals, and the finish of all the above items. Also, the very expensive glass in the window may break, or the newer style vinyl and aluminum welded fused sashes may crack and possibly affect the integrity of the international design pressure ratings, wind pressure ratings and high impact resistance ratings.

Supporting the combined weight of both sashes can be a difficult task, and this risks damage to the sashes or the integrity of the framework especially in view of the fact that modern windows must follow federal and local building codes and comprise design pressure rated, wind pressure rated and high impact rated glass, with window sashes themselves containing double pane, triple pane or more. Often by accident the cumbersomeness of the window sashes or the fatigue of supporting the weight of the window sashes, may result in the sashes being dropped and damaged, the glass and seals being broken, and the sills and the integrity of the track mechanism being compromised.

It is therefore an objective of the present invention to provide a safe and easy to use support system for these heavy, tilt-in window sashes for use when the window sashes are to be cleaned, painted and/or repaired that holds the individual window sashes independently of each other at a safe, efficient, and comfortable height for a single person. This enables the user to have both hands free to do such work, without the removal of the sashes from the framework, which may possibly damage the window sashes, glass, or the framework or cause injury to the user.

In the past other devices have been developed for a number of different window applications. However, none of these prior art devices have specifically addressed the unique needs of supporting the individual sashes of a tilt-in window and holding the sashes independently of each other.

One such prior art device comprises a pair of supports with a platform at the top of each support. The platforms hold the top and bottom tilt-in type windows so they can be easily cleaned. However, the main platform body that interacts with the lower sash is not adjustable for height. This device has a predetermined height for the platform. Other prior art devices combine adjustable height bearing stands and roller platform assemblies that can be fixed at a pre-adjusted heights. However, the bearing portions of these devices lack the ability to engage with a window sash.

Another prior art device comprises a static support device and an associated method used to position tilt-in windows into an orientation that is ergonomically efficient for washing. However, this device only holds the lower sash at a particular height and is not able to independently hold the upper sash. This device relies on the lower sash being supported by the device and the upper sash coming into direct contact with the lower sash.

Yet another prior art device comprises a cord tensioned by a spring that supports the sash of a hung window in a stationary position while the sash is tilted for cleaning. However, this device does not address the upper sash and appears to be built into the framework of the window.

At this time none of the prior art devices have been designed to telescope a double platform system to simultaneously hold both lower and upper sashes independently of each other at a tilt-in, horizontal position that is safe, efficient and comfortable for the individual user as to effectively paint, clean or maintain the window sashes, glass or any other component of the window frame construction.

In view of the foregoing, there is a need for improved techniques for providing a device for supporting upper and lower sashes of a tilt-in type window independently of each other that is height adjustable and engages the window sashes.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a diagrammatic side view of the stand in an unfolded position holding window sashes;

FIG. 2 is a diagrammatic front view of the stand in a folded position, and

Figure 1:
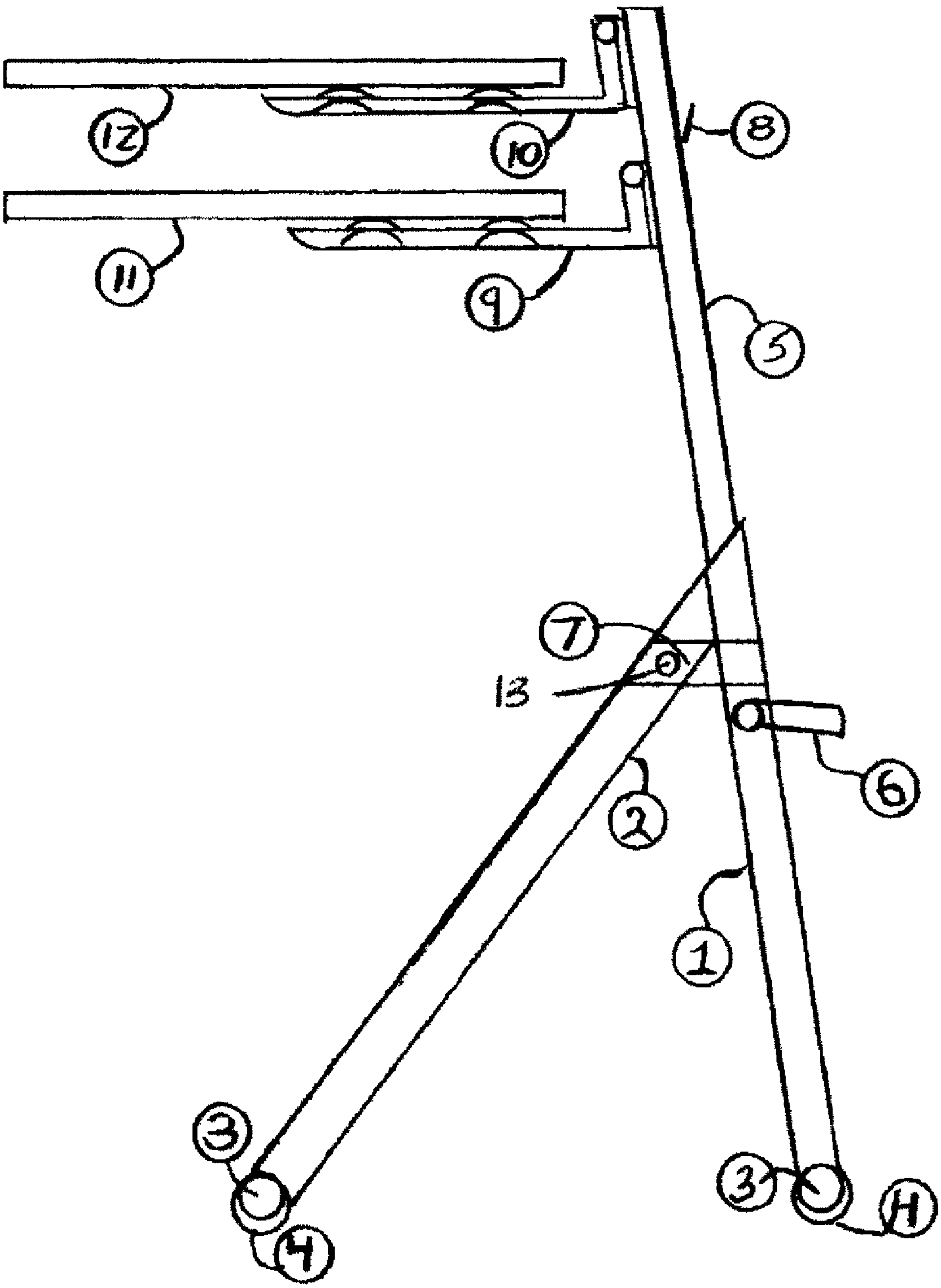
FIGS. 1, 2 and, 3 illustrate an exemplary folding support stand for tilt-in windows that is adapted to support said windows while they are being cleaned, painted or maintained, in accordance with an embodiment of the present invention.

Unless otherwise indicated illustrations in the figures are not necessarily drawn to scale.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention will now be described in detail with reference to embodiments thereof as illustrated in the accompanying drawings.

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Preferred embodiments of the present invention provide a device to be used with double hung or single hung windows with window sashes that have a tilt-in feature. Preferred embodiments have the ability to hold both lower and upper window sashes at a safe, efficient and comfortable height in a horizontal plane independently of each other, so an individual may clean, paint and maintain the window sashes and the framework components of the window. Preferred embodiments may be used with any type of tilt-in window sash regardless of its design as well as any awning window or specialty window with a tilt-in feature.

Preferred embodiments of the present invention comprise two independently folding support structures mounted to a telescoping static slide that is adjustable in height and connected to a platform comprised of a pair of legs that are connected at a joint and can be brought from a parallel position into an angled position, whereby the folding support structures engage with the window sashes in a horizontal manner parallel to the floor, thereby holding the sashes at a comfortable, efficient and safe height for the user to clean, paint or maintain the sashes or any and all components of the framework. Preferred embodiments hold the top and bottom sashes independently to enable cleaning, painting and maintenance of both tilt-in sashes without the removal of the sashes from the framework and without the user trying to balance one sash while working on the other sash, making it a much easier task.

Figure 2:
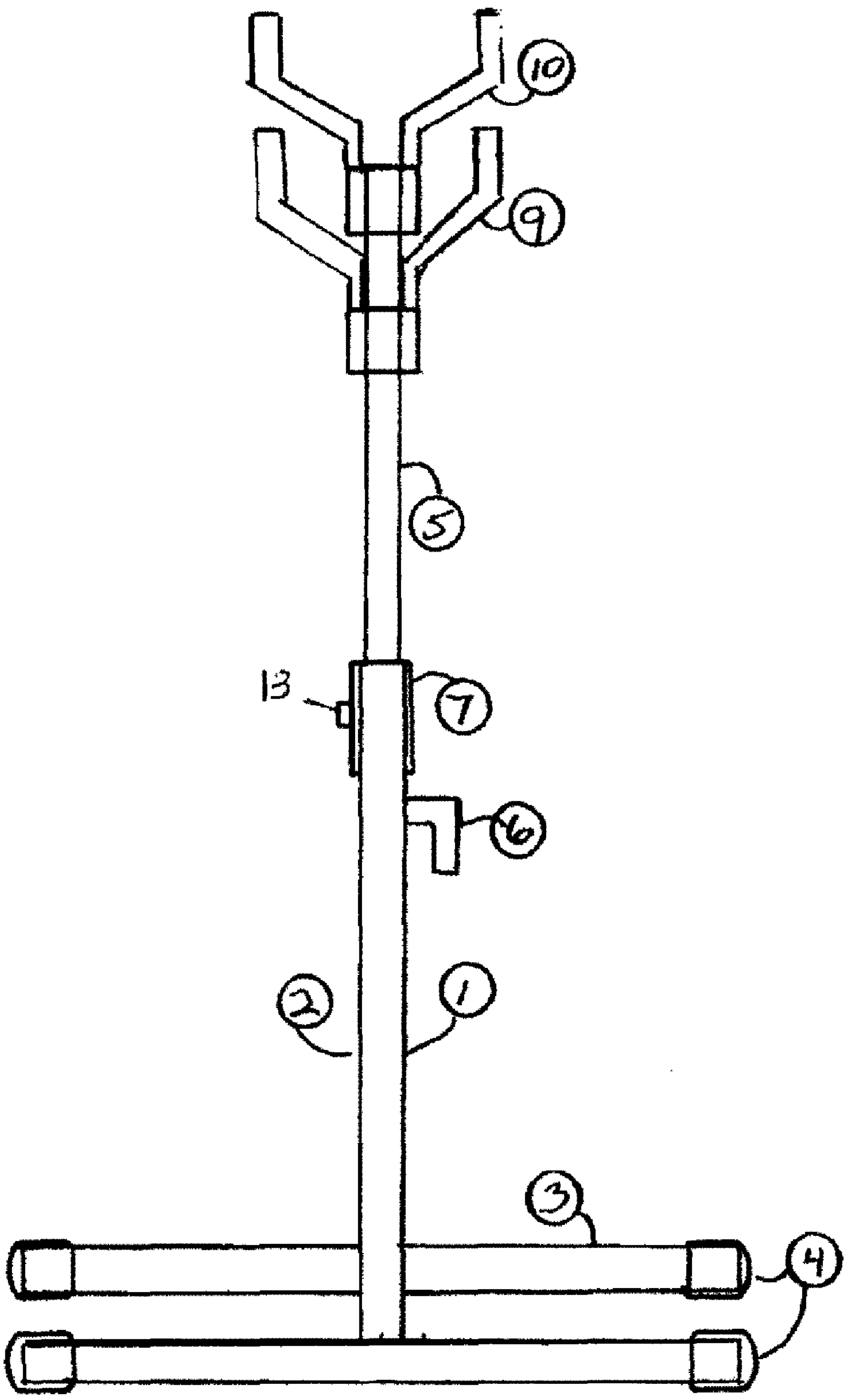
Figure 3:
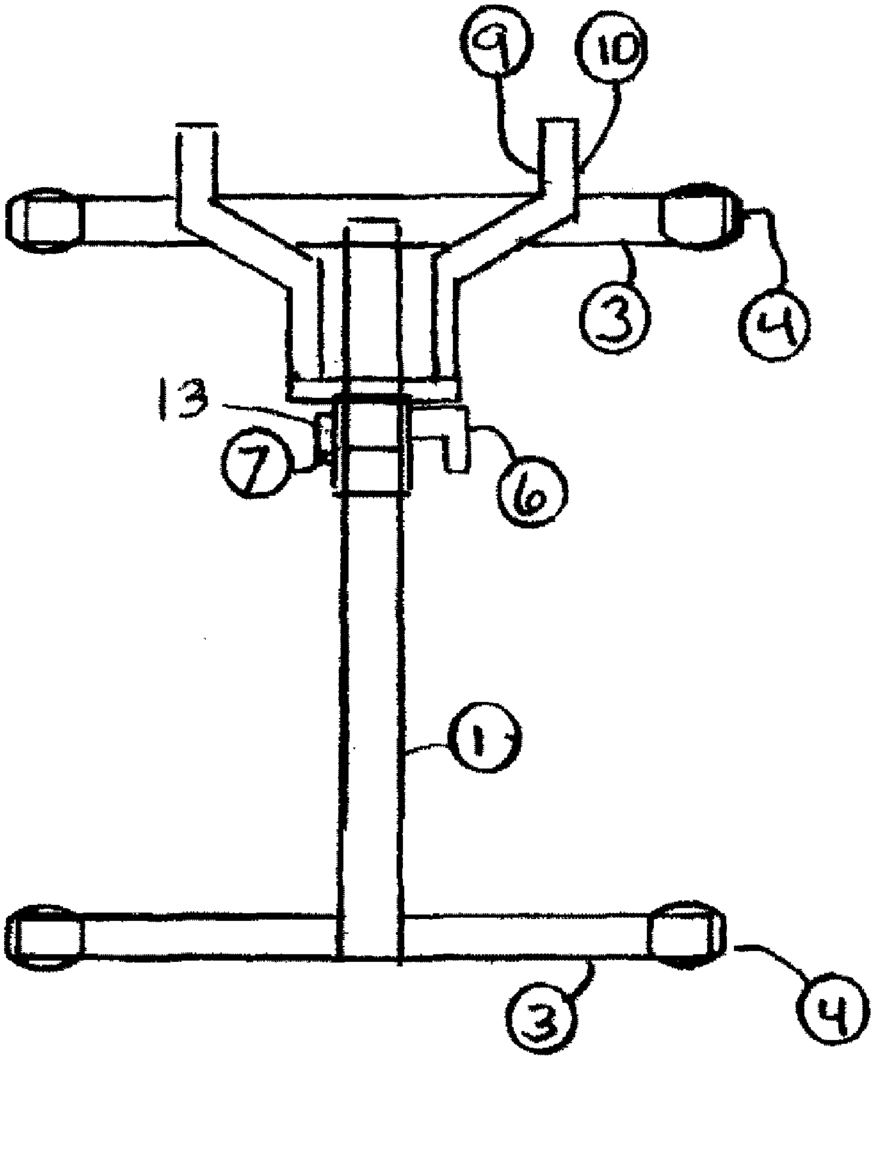
FIG. 3 is a diagrammatic top view of the stand in the unfolded position.

FIGS. 1, 2 and 3 illustrate an exemplary folding support stand for tilt-in windows that is adapted to support said windows while they are being cleaned, painted or maintained, in accordance with an embodiment of the present invention. FIG. 1 is a diagrammatic side view of the stand in an unfolded position holding window sashes 11 and 12; FIG. 2 is a diagrammatic front view of the stand in a folded position, and FIG. 3 is a diagrammatic top view of the stand in the unfolded position. In the present embodiment, the stand comprises a base leg 1 and a hinged leg 2 that are square hollow tubes with hinged leg 2 being longer than base leg 1. In alternate embodiments the legs may be made in various different configurations and in various different shapes. For example, without limitation, legs in alternate embodiments may be round hollow tubes or solid or partially solid tubes, and some alternate embodiments may comprise three or more legs. In the present embodiment, legs 1 and 2 are hinged together by a U-joint 7 welded to base leg 1 and a bolt 13 that passes through hinged leg 2 and U-joint 7. When hinged leg 2 is extended to the angled unfolded position, being slightly longer than base leg 1, hinged leg 2 engages base leg 1 to create a stop in this angled unfolded position. In alternate embodiments the legs may be held in the unfolded position using various different means such as, but not limited to, folding hinges, a locking bolt and hole, a sliding linkage, etc. In other alternate embodiments, the legs may not be hinged and instead may be fixed in an open position.

Within base leg 1 in the present embodiment, is an extension tube 5 that has an outside dimension that fits into a hollow top portion of base leg 1. Extension tube 5 can be raised or lowered and locked into place by a tension lever 6. In the present embodiment, tension lever 6 is a nut welded to base leg 1 with a bolt with an angled handle for locking extension tube 5 within base leg 1 at an appropriate height for window sash maintenance. However, means other than a tension lever may be used to lock the extension tube in place in alternate embodiments such as, but not limited to, a bolt, a clamp, a spring pin, etc. In the present embodiment, base leg 1 and hinged leg 2 comprise tubular feet 3 that are welded or otherwise attached to each leg. Feet 3 comprise non-skid floor protectors 4 that slide over the ends of feet 3. In alternate embodiments the legs may comprise various different types of feet such as, but not limited to, flat bars, disc-shaped feet, spherical feet, etc., and some embodiments may not comprise any feet. Embodiments that do not comprise feet may include non-skid covers over the ends of the legs. Other alternate embodiments may comprise casters on the ends of the legs rather than feet. In the present embodiment, the tube construction of base leg 1, hinged leg 2, feet 3, and extension tube 5 may be made of any generally rigid material such as, but not limited to, metal, aluminum, plastics, etc.

In the present embodiment, two rotating, hinged supports 9 and 10 are attached to extension tube 5 to hold the window sashes while cleaning, painting or maintenance. Hinged supports 9 and 10 may be welded or bolted to extension tube 5, and may be made of any generally rigid material such as, but not limited to metal, aluminum, plastic, etc. Hinged supports 9 and 10 are U-shaped with two narrow fingers that are preferably covered or coated with a non-skid and anti-marring material such as, but not limited to, liquid plastic, rubber, cork, etc. to protect window sashes 11 and 12 resting on hinged supports 9 and 10. However, the finger supports in alternate embodiments may not be covered in a non-skid material. In other alternate embodiments, the supports for the window sashes may be shaped differently than a U-shape; for example, without limitation, some supports may be flat platforms. Referring to FIG. 1, window sashes 11 and 12 are shown in a tilted-in horizontal position resting on hinged supports 9 and 10 whereby lower tilt-in window sash 11 is supported on lower hinged support 9 and upper tilt-in window sash 12 is supported on upper hinged support 10. In alternate embodiments, the supports that hold the window sashes may not be hinged and may instead be fixed in a horizontal position or only the upper support may be hinged to move out of the way of the lower support. In the present embodiment, the stand comprises an accessory clip 8 that is welded or bolted to extension tube 5. Accessory clip 8 enables the user to attach accessories to the stand such as, but not limited to, a basket for holding cleaning supplies or other tools, a lamp, a paint tray, a paper towel holder, etc. Alternate embodiments may comprise multiple accessory clips, and other alternate embodiments may be implemented without an accessory clip.

In typical use of the present embodiment, a user places the support stand in the unfolded portion near the center of the window frame at an approximate distance from the window to accept window sashes 11 and 12 when tilted in. For example, without limitation, the user may place the stand in a position approximately four inches further from the window frame than where the lower sash tilts into the room for a standard size window. However, the placement of the stand may vary depending on various factors such as, but not limited to, the size of the window, the height of the window, user preference, etc. Non-skid floor protectors 4 hold the stand in a safe and convenient position and protect the floor from scratches and other marring while in use. The user then extends extension tube 5 to a safe and comfortable working height for the user and for window sashes 11 and 12 and locks extension tube 5 in place by tightening tension lever 6. The user then rotates hinged support 9 into a horizontal position and tilts in lower window sash 11 onto hinged support 9 to be cleaned, painted or maintained. The non non-skid and anti-marring material on the fingers of hinged support 9 in the present embodiment helps with the safe handling and stability of window sash 11. Once the work on lower window sash 11 has been completed, the user lowers upper window sash 12 along the track mechanism to approximately 4 inches from where lower window sash 11 is tilted in. The height of upper window sash 12 may be higher or lower when tilted-in in many cases. The user then rotates upper hinged support 10 into its horizontal position and tilts in upper window sash 12 onto upper hinged support 10 to be cleaned, painted or maintained. The present embodiment enables the user to tilt-in the individual sashes one at a time onto a safe, stable platform on which to work while having both hands free to clean, paint or maintain the window sashes or framework without holding the tilted-in lower sash and attempting to work on the upper sash. Hinged supports 9 and 10 hold window sashes 11 and 12 independently of each other enabling the user to tilt-in one sash or both sashes. The present embodiment also enables the user to tilt-in the sashes with out removal of the sashes from the framework, thereby generally eliminating damage that may be caused to the track mechanism on which double hung tilt-in windows fundamentally function. Once the user has completed the cleaning, painting or maintenance of sashes 11 and 12 or the window frame, the process is reversed and window sashes 11 and 12 are tilted back into place. Referring to FIG. 2, base leg 1, hinged leg 2, extension tube 5, and hinged supports 9 and 10 can be collapsed into a compact vertical position for easy storage when not in use. The present embodiment is also preferably lightweight to enable the stand to be easily moved from place to place.

Some embodiments of the present invention may comprise various accessories. For example, without limitation, a maintenance work platform may be included that enables a user to place tools, materials, or any other item needed to complete the task at hand. The platform would be attached to accessory clip 8. An extension bar may be included that can be placed between the base leg and the extension tube to enable the user to reach high windows. Foam pads may be included for the hinged supports to support only the glass area of the window sashes when painting the interior and exterior frames of the sashes. Some embodiments may include a spreader bar for spreading the track mechanism of the window to aid in tilting-in the window sashes. Some embodiments may include attachments for mulled units, which are two window units side by side. Some embodiments may include an attachment for the upper hinged support to accommodate an upper sash that is a different size than the lower sash. Those skilled in the art, in light of the present teachings, will readily recognize that various other accessories may be included with alternate embodiments of the present invention such as, but not limited to, clamps, cushions, hooks, baskets, platforms, towel holder, spray bottle holder, paint tray, etc.

Alternate embodiments of the present invention may be implemented that hold only one window sash, and other alternate embodiments may be implemented to hold more than two window sashes. Yet other alternate embodiments may be implemented that do not collapse. Yet other alternate embodiments may be implemented that are not adjustable in height.

Having fully described at least one embodiment of the present invention, other equivalent or alternative methods of providing a support stand for tilt-in style windows according to the present invention will be apparent to those skilled in the art. The invention has been described above by way of illustration, and the specific embodiments disclosed are not intended to limit the invention to the particular forms disclosed. For example, the particular implementation of the window sash supports may vary depending upon the particular type windows used. The window sash supports described in the foregoing were directed to implementations for use with windows that are standard or near standard in size; however, similar techniques are to provide window sash supports that are wider or narrower or longer or shorter to accommodate larger and smaller windows. Variously sized implementations of the present invention are contemplated as within the scope of the present invention. The invention is thus to cover all modifications, equivalents, and alternatives falling within the spirit and scope of the following claims.

Claim elements and steps herein have been numbered and/or lettered solely as an aid in readability and understanding. As such, the numbering and lettering in itself is not intended to and should not be taken to indicate the ordering of elements and/or steps in the claims.

What is claimed is:

1. A window maintenance apparatus for a tilt-in sash, the apparatus comprising:

a first leg member being configured for extending generally upwards from a floor towards a window, said first leg member comprising a first foot being configured for resting on the floor;

a second leg member being configured to be joined to said first leg member, said second leg member comprising a second foot being configured for resting on the floor, in which said second leg member joined to said first leg member supports the apparatus;

an extension member being configured for extending upwardly from said first leg member in which a length of said extension member above said first leg member is adjustable;

a locking mechanism being configured for locking said extension member at an adjusted length;

a first sash support being configured for rotating about said extension member and for supporting the tilt-in sash in a generally horizontal position; and a second sash support being configured for rotating about said extension member and for supporting a second tilt-in sash in a generally horizontal position above the tilt-in sash.

2. The apparatus as recited in claim 1, further comprising floor protectors being configured for generally maintaining a position on the floor and mitigating marring of the floor.

3. The apparatus as recited in claim 1, further comprising an accessory clip being configured for removably joining accessories to the apparatus.

4. The apparatus as recited in claim 1, further comprising material being joined to said first sash support and said second sash support for mitigating damage to the tilt-in sashes during maintenance.

5. A window maintenance apparatus for a tilt-in sash, the apparatus comprising:

a base leg for extending generally upwards from a floor towards a window, said base leg comprising a first foot for resting on the floor;

a hinged leg joined to said base leg proximate an end of said base leg distal from said first foot for extending generally downwards towards the floor, said hinged leg comprising a second foot for resting on the floor, wherein said base leg and said hinged leg support the apparatus;

an extension tube for extending upwardly from said base leg where a length of said extension tube above said base leg is adjustable;

a locking mechanism for locking said extension tube at an adjusted length above said base leg;

a first sash support rotatably joined at a first position on said extension tube for rotating about said extension tube from a first position to a second position for supporting the tilt-in sash in a generally horizontal position; and a second sash support rotatably joined at a second position on said extension tube for rotating about said extension tube from a first position to a second position for supporting a second tilt-in sash in a generally horizontal position.

6. The apparatus as recited in claim 5, further comprising floor protectors joined to said first foot and said second foot for generally maintaining a position on the floor and mitigating marring of the floor.

7. The apparatus as recited in claim 5, further comprising at least one accessory clip joined to said extension tube for removably joining accessories to the apparatus.

8. The apparatus as recited in claim 5, further comprising a non-skid and anti-marring material joined to said first sash support for mitigating damage to the tilt-in sash during maintenance.

9. The apparatus as recited in claim 5, wherein said hinged leg is joined to said base leg with a hinge for folding the apparatus for storage.

10. The apparatus as recited in claim 9, wherein said first sash support is further rotatably joined to said extension tube for rotation to a vertical position for storage.

11. The apparatus a recited in claim 5, wherein said first sash support further comprises a U-shape with narrow fingers for supporting the tilt-in sash.

12. The apparatus as recited in claim 5, wherein said first sash support further comprises a platform for supporting the tilt-in sash.

13. The apparatus as recited in claim 5, wherein said extension tube telescopes into said base leg for adjustment of said length.

14. The apparatus as recited in claim 13, wherein said locking mechanism further comprises a tension lever for locking a position of said extension tube in said base leg.

15. The apparatus as recited in claim 13, wherein said base leg, said hinged leg and said extension tube are hollow tubes and said extension tube fits within said base leg.

16. The apparatus as recited in claim 5, wherein said hinged leg is longer than said base leg and said hinged leg and said base leg form two sides of a triangle.

17. A method of using a window maintenance apparatus for a tilt-in sash, the method comprising the steps of:

positioning a base leg and a hinged leg proximate the window to be maintained;

adjusting an extension tube for a desired length above said base leg;

locking said extension tube at said desired length;

rotating a first sash support about said extension tube to a position for supporting the tilt-in sash in a generally horizontal position;

tilting the tilt-in sash to a horizontal position to rest on said first sash support to provide maintenance to the tilt-in sash;

rotating a second sash support about said extension tube to a position for supporting a second tilt-in sash in a generally horizontal position above the tilt-in sash; and tilting the second tilt-in sash to a horizontal position to rest on said second sash support to provide maintenance to the second tilt-in sash.

* * * * *